(12) United States Patent
Zhao

(10) Patent No.: US 9,207,974 B2
(45) Date of Patent: Dec. 8, 2015

(54) INFORMATION DELIVERY METHOD AND DEVICE

(75) Inventor: Yang Zhao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 284 days.

(21) Appl. No.: 13/881,018

(22) PCT Filed: Jun. 17, 2011

(86) PCT No.: PCT/CN2011/075893
§ 371 (c)(1),
(2), (4) Date: Apr. 23, 2013

(87) PCT Pub. No.: WO2012/055248
PCT Pub. Date: May 3, 2012

(65) Prior Publication Data
US 2013/0227580 A1  Aug. 29, 2013

(30) Foreign Application Priority Data

Oct. 25, 2010 (CN) .......................... 2010 1 0518285

(51) Int. Cl.
*G06F 9/48* (2006.01)
*G06F 9/50* (2006.01)
*G06F 9/54* (2006.01)

(52) U.S. Cl.
CPC ............. *G06F 9/4843* (2013.01); *G06F 9/505* (2013.01); *G06F 9/544* (2013.01); *G06F 2209/502* (2013.01)

(58) Field of Classification Search
None
See application file for complete search history.

(56) References Cited

U.S. PATENT DOCUMENTS

| 2009/0094437 | A1 | 4/2009 | Fukuda | |
| 2010/0287320 | A1* | 11/2010 | Querol et al. | 710/260 |
| 2010/0325420 | A1* | 12/2010 | Kanekar | 713/151 |

FOREIGN PATENT DOCUMENTS

| CN | 1921457 A | 2/2007 |
| CN | 101110043 A | 1/2008 |
| CN | 101262425 A | 9/2008 |
| CN | 101403982 A | 4/2009 |
| CN | 101634953 A | 1/2010 |

(Continued)

OTHER PUBLICATIONS

International Search Report in international application No. PCT/CN2011/075893, mailed on Sep. 29, 2011.

(Continued)

*Primary Examiner* — Emerson Puente
*Assistant Examiner* — Jonathan R Labud
(74) *Attorney, Agent, or Firm* — Oppedahl Patent Law Firm LLC

(57) ABSTRACT

The application discloses an information delivery method and device. The device includes: a receiving module configured to receive information to be delivered and a name of a target task which are sent from a source task; a searching module configured to search, according to the name of the target task, a preset global relationship table for a core number corresponding to the name of the target task; and a sending module configured to search a multi-core system for a core corresponding to the core number and to send the information to be delivered to the task corresponding to the name of the target task in the core. The information delivery method and device provided by the disclosure enable the delivery of information within a multi-core system or between multi-core systems with high reliability.

6 Claims, 4 Drawing Sheets

(56) References Cited

FOREIGN PATENT DOCUMENTS

| CN | 101976208 A | 2/2011 |
|---|---|---|
| RU | 2286595 C2 | 10/2006 |

OTHER PUBLICATIONS

English Translation of the Written Opinion of the International Search Authority in international application No. PCT/CN2011/075893, mailed on Sep. 29, 2011.

* cited by examiner

INFORMATION DELIVERY METHOD AND DEVICE

TECHNICAL FIELD

The disclosure relates to the field of multi-core technologies and more particularly to an information delivery method and device.

BACKGROUND

In existing multi-core systems, each processor consists of a plurality of cores, each of which contains one or more hardware threads. Due to the complexity of services, a communication device consists of service modules of various service-types, control modules and switching singleboards, wherein each singleboard employs one or more multi-core processors.

The information communication in an existing multi-core system, as shown in FIG. 1, employs the conventional single-core system processing mode in which information communication is realized for the intra-singleboard or inter-singleboard tasks through IPC (Inter-Process Communication). In the IPC, information communication is achieved based on TCP/IP or memory sharing, however, such an information communication mode cannot embodiment the advantages of a multi-core system in a multi-core system. With the increase in the number of the cores in a multi-core system, the mechanism taking a core as a basic information communication unit becomes significantly complicated, when a great amount of information is aggregated to the singleboard of a control plane for being processed, the singleboard of the control plane may be overloaded, leading to a reduction in the reliability of information delivery. In addition, in the IPC mode, the processing workloads of multi-core systems cannot be balanced, making it impossible to achieve a high-efficiency communication when there is a plurality of task instances in the multi-core systems.

SUMMARY

In view of the problem above, the main object of the disclosure is to provide an information delivery method and device to realize the reliable delivery of information within a multi-core system or between multi-core systems.

In order to address the technical problem above, the disclosure provides an information delivery method, which includes the following steps of:

receiving information to be delivered and a name of a target task which are sent from a source task;

searching, according to the name of the target task, a preset global relationship table for a core number corresponding to the name of the target task; and searching a multi-core system for a core a corresponding to the core number and sending the information to be delivered to the task corresponding to the name of the target task in the core.

Preferably, the preset global relationship table may contain a correspondence relationship between a name of a task in the multi-core system and a core number of a core in which the task is contained.

Preferably, the source task and the target task may be contained in a same core of a same multi-core system, or in different cores of a same multi-core system, or in cores of different multi-core systems.

Preferably, the target task may include one or more target task instances, which are contained in a same core of a same multi-core system, or in different cores of a same multi-core system, or in cores of different multi-core systems.

Preferably, in the information delivery method, when the target task includes a plurality of target task instances, a target task instance may be selected according to a principle of proximity as the target task for the information to be delivered.

The disclosure further provides an information delivery device, which includes:

a receiving module configured to receive information to be delivered and a name of a target task which are sent from a source task;

a searching module configured to search, according to the name of the target task, a preset global relationship table for a core number corresponding to the name of the target task; and a sending module configured to search a multi-core system for a core corresponding to the core number and to send the information to be delivered to the task corresponding to the name of the target task in the core.

Preferably, the preset global relationship table may contain a correspondence relationship between a name of a task in a multi-core system and a core number of a core in which the task is contained.

Preferably, the source task and the target task may be contained in a same core of a same multi-core system, or in different cores of a same multi-core system, or in cores of different multi-core systems.

Preferably, the target task may include one or more target task instances, which are contained in a same core of a same multi-core system, or in different cores of a same multi-core system, or in cores of different multi-core systems.

The searching module may be further configured to select, when the target task includes a plurality of target task instances, a target task instance according to a principle of proximity as the target task for the information to be delivered.

It can be known from the description above that the information delivery method and device provided herein realize the delivery of information within a multi-core system or between multi-core systems with high reliability, improve information delivery speed and efficiency, balance loads of task instances in a multi-core system and prevents a failed information delivery.

DETAILED DESCRIPTION

The realization of the object, functional features and advantages of the disclosure will be described further by reference to accompanying drawings when read in conjunction with embodiments. It should be appreciated that the embodiments described herein are merely illustrative of the disclosure but are not to be construed as limiting the disclosure.

Figure 1:
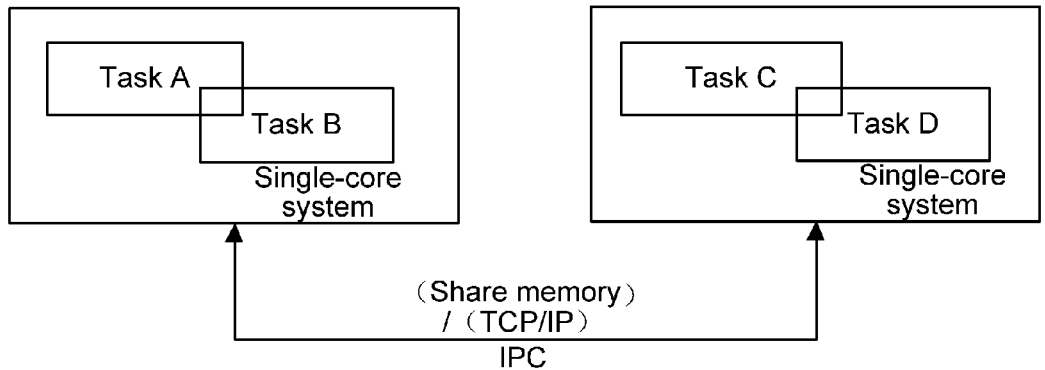
FIG. 1 is a schematic diagram illustrating the structure of a multi-core system according to the conventional art.
Figure 2:
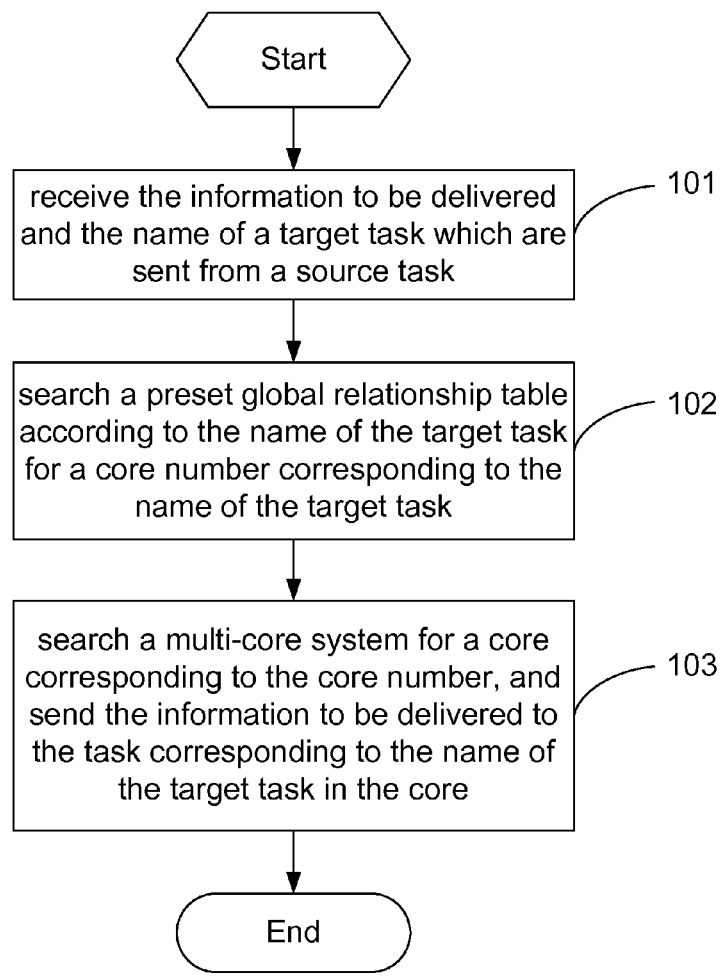
FIG. 2 is a schematic diagram illustrating the flow of an embodiment of an information delivery method provided in the disclosure.

Refer to FIG. 2, an embodiment of an information delivery method provided in the disclosure comprises the following steps:

step 101: the information to be delivered and the name of a target task which are sent from a source task are received;

step 102: a preset global relationship table is searched according to the name of the target task for a core number corresponding to the name of the target task; and step 103: a multi-core system is searched for a core corresponding to the core number, and the information to be delivered is sent to the task corresponding to the name of the target task in the core.

The task corresponding to the name of the target task in the core is the target task.

Further, in the embodiment of the information delivery method, the preset global relationship table contains the correspondence relationship between the name of a task in the multi-core system and the core number of the core in which the task is contained.

In the application of the information delivery method to a multi-core system, the correspondence relationship between a task name and the core number of the core in which the task is contained refers to the correspondence relationship between all the task names in the multi-core system and the core numbers of the cores in which the task names are contained or the correspondence relationship between all the task names in all the multi-core systems which communicate with each other and the core numbers of the cores in which the tasks are contained.

Further, in the embodiment of the information delivery method, the source task and the target task are contained in the same core of the same multi-core system or in different cores of the same multi-core system or in cores of different multi-core systems.

Further, in the embodiment of the information delivery method, the target task includes one or more target task instances which are contained in the same core of the same multi-core system or in different cores of the same multi-core system or in cores of different multi-core systems.

Figure 3:
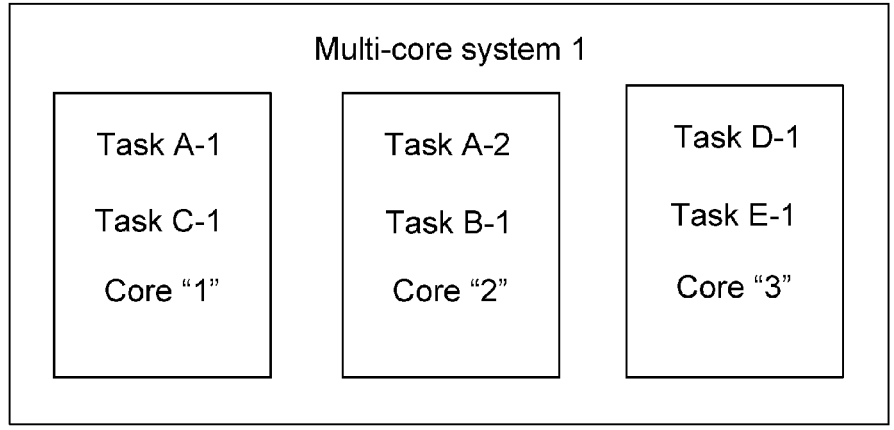
FIG. 3 is a schematic diagram illustrating the structure of a multi-core system provided in the disclosure.

Refer to FIG. 3, assuming that the multi-core system 1 is an independent multi-core system, a core "1", a core "2" and a core "3" are included therein. Tasks A-1 and C-1 are contained in the core "1", tasks A-2 and B-1 are contained in the core "2", and tasks D-1 and E-1 are contained in the core "3". The preset global relationship table of the multi-core system 1 contains the correspondence relationship between the following task names and the core numbers of the cores in which the tasks are contained: A-1→"1", A-2→"2", B-1→"2", C-1→"1", D-1→"3" and E-1→"3".

Figure 4:
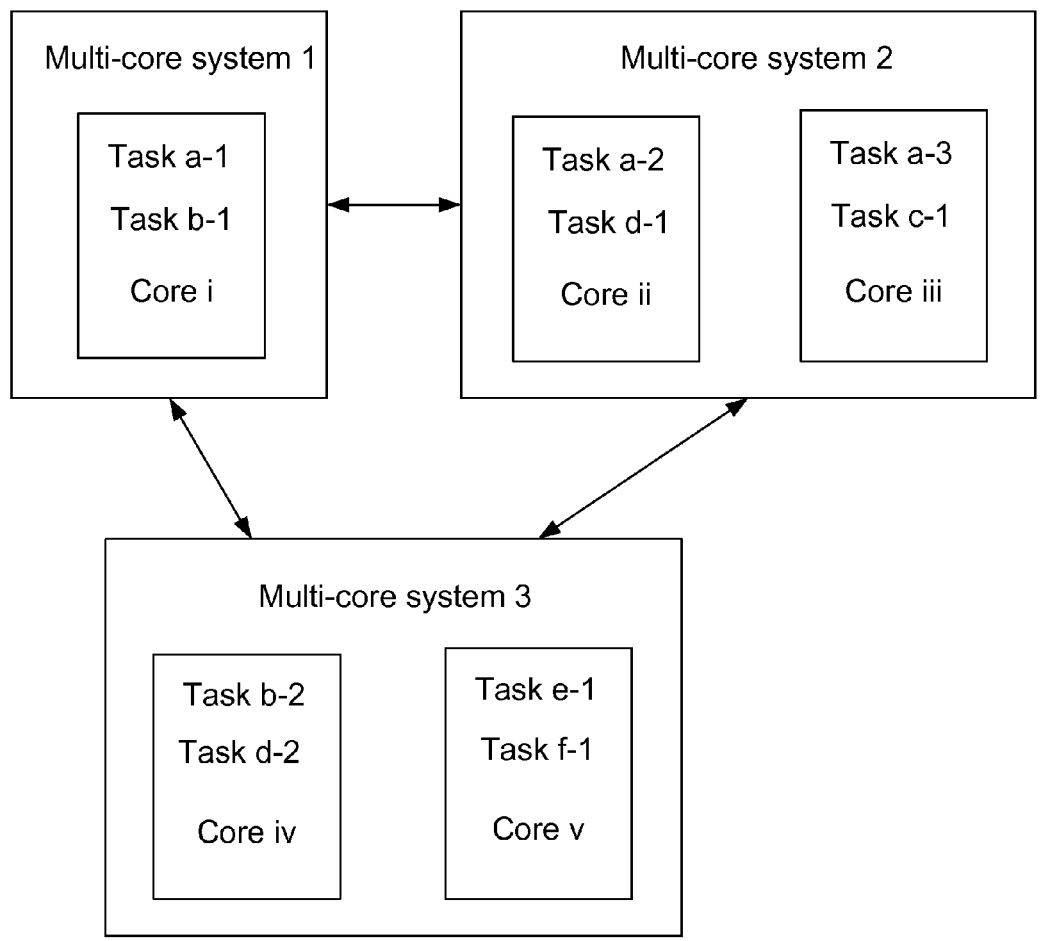
FIG. 4 is a schematic diagram illustrating the structure of multi-core systems provided in the disclosure.

Refer to FIG. 4, assuming that multi-core systems 1, 2 and 3 are multi-core systems which communicate with each other, the multi-core system 1 includes a core i in which tasks a-1 and b-1 are contained, the multi-core system 2 includes a core ii in which tasks a-2 and d-1 are contained and a core iii in which tasks a-3 and c-1 are contained. The multi-core system 3 includes a core iv in which tasks b-2 and d-2 are contained and a core v in which tasks e-1 and f-1 are contained. The preset global relationship table of the multi-core systems contains the correspondence relationship between the following task names and the core numbers of the cores in which the tasks are contained: a-1→i, a-2→ii, a-3→iii, b-1→i, b-2→iv, c-1→iii, d-1→ii, d-2→iv, e-1→v and f-1→v.

Further, in the embodiment of the information delivery method, when the target task has only one target task instance, the information to be delivered is directly sent to the target task instance.

Further, in the embodiment of the information delivery method, if the target task includes a plurality of target task instances, then a target task instance is selected according to a principle of proximity as the target task for the information to be delivered. The principle of proximity is as follows: the target task instance in the same core as the source task is selected preferentially as the target task for the information to be delivered; if no target task instance is in the same core as the source task, then the target task instance in the same multi-core system as the source task is selected preferentially as the target task for the information to be delivered; if no target task instance is in the same core as the source task or in the same multi-core system as the source task, then the target task instance in a multi-core system different from the multi-core system where the source task is located is selected as the target task for the information to be delivered.

Further, if the source task and the target task are in different multi-core systems or in different cores of the same multi-core system, then one of the target task instances in the target task is selected, according to both the loads and the normality/abnormality condition of the target task instances, as the target task for the information to be delivered.

Take FIG. 4 as an example, assuming that the task d-1 is a source task, the task d-1 needs to send the information to be delivered to a task "a" which includes three task instances a-1, a-2 and a-3, wherein the task a-2 is in the core ii, the task a-3 is in the core iii and the task a-1 is in the core i; the task d-1 is in the core ii. According to the principle of proximity, the target task instance a-2 in the same core as the source task d-1 is preferentially selected as the target task for the information to be delivered. If the target task instance selected as the target task is abnormal or overloaded, then another target task instance is selected upon the same principle as the target task for the information to be delivered. If the target task instance a-2 is abnormal or overloaded, then the target task instance a-3 in the same multi-core system as the source task d-1 is selected as the target task for the information to be delivered; if the target task instances a-2 and a-3 are both abnormal or overloaded, then the target task instance a-1 in a different multi-core system with respect to the source task is selected as the target task for the information to be delivered.

Take FIG. 4 as an example, assuming that the task c-1 is a source task, the task c-1 needs to send the information to be delivered to the task d, which includes two task instances d-1 and d-2; the source task c-1 and the task d-1 are in the same multi-core system 2; the task d-2 is in the multi-core system 3. According to the principle of proximity, the task d-1 is preferentially selected as the target task for the information to be delivered; if the task d-1 is abnormal or overloaded, then the task d-2 is selected as the target task for the information to be delivered.

Take FIG. 4 as an example, assuming that the task d-2 is a source task, the task d-2 needs to send the information to be delivered to the task a. The task a includes three task instances a-1, a-2 and a-3, none of which is in the same multi-core system as the source task d-2, the task a-1 being in the multi-core system 1, and the tasks a-2 and a-3 being in the multi-core system 2. If no task instance can be selected according to the principle of proximity, then according to the normality/abnormality condition and the loads of the three task instances of the task a, a normal low-loaded task instance is selected as the target task for the information to be delivered.

The selection based on the principle of proximity improves the speed and efficiency of information delivery, avoids the occurrence of a failed information delivery and guarantees balanced workloads of different task instances of the same task.

Further, in the embodiment of the information delivery method, if the target task includes a plurality of target task instances, then the least-loaded target task instance may be directly searched as the target task for the information to be delivered, without using the principle of proximity. Take FIG. 4 as an example, assuming that the task a-1 is a source task, the task a-1 needs to send the information to be delivered to the task b which has a high-loaded task instance b-1 and a low-loaded task instance b-2. Thus, the task b-2 is selected as the target task for the information to be delivered, and the information to be delivered is sent to the task b-2 in the core iv. If the target task instance selected as the target task is abnormal, then another target task instance is selected upon the same principle as the target task for the information to be delivered, thereby guaranteeing the balanced workloads of different task instances of the same task and preventing the occurrence of a failed information delivery.

The embodiment of the information delivery method can realize the delivery of information within a multi-core system or between multi-core systems with high reliability, improve information delivery speed and efficiency, balance workloads of task instances in a multi-core system and prevents a failed information delivery.

Figure 5:
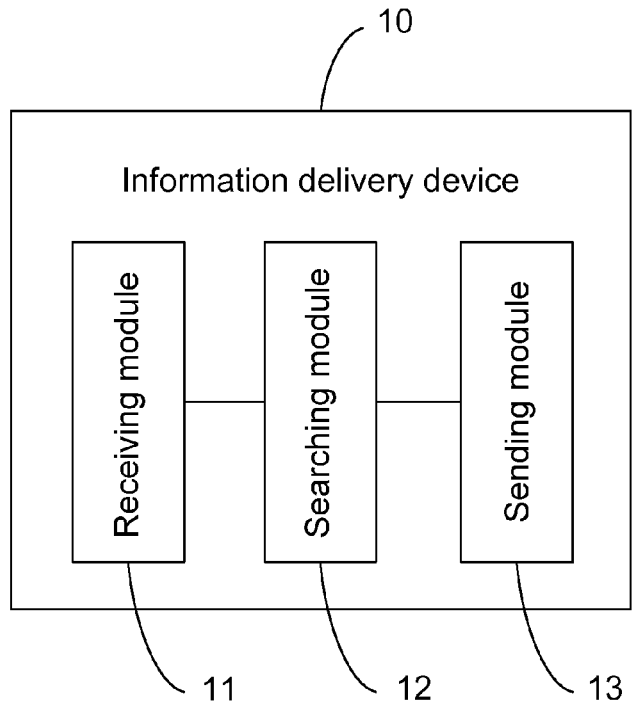
FIG. 5 is a schematic diagram illustrating the structure of an information delivery device provided in the disclosure.

Refer to FIG. 5, an embodiment of an information delivery device 10 is provided in the disclosure, which comprises a receiving module 11, a searching module 12 and a sending module 13. The receiving module 11 is configured to receive the information to be delivered and the name of a target task which are sent from a source task; the searching module 12 is configured to search, according to the name of the target task, a preset global relationship table for a core number corresponding to the name of the target task; and the sending module 13 is configured to search a multi-core system for a core corresponding to the core number, and to send the information to be delivered to the task corresponding to the name of the target task in the core.

The task corresponding to the name of the target task in the core is the target task.

Further, in the embodiment of the information delivery device, the preset global relationship table contains the correspondence relationship between the name of a task in the multi-core system and the core number of the core in which the task is contained.

In the application of the information delivery device 10 in a multi-core system, the correspondence relationship between the task name and the core number of the core in which the task is contained refers to the correspondence relationship between all the task names in the multi-core system and the core numbers of the cores in which the task names are contained or the correspondence relationship between all the task names in all the multi-core systems which communicate with each other and the core numbers of the cores in which the tasks are contained.

Further, in the embodiment of the information delivery device, the source task and the target task are contained in the same core of the same multi-core system or in different cores of the same multi-core system or in cores of different multi-core systems.

Further, in the embodiment of the information delivery device, the target task includes one or more target task instances which are contained in the same core of the same multi-core system or in different cores of the same multi-core system or in cores of different multi-core systems.

Figure 6:
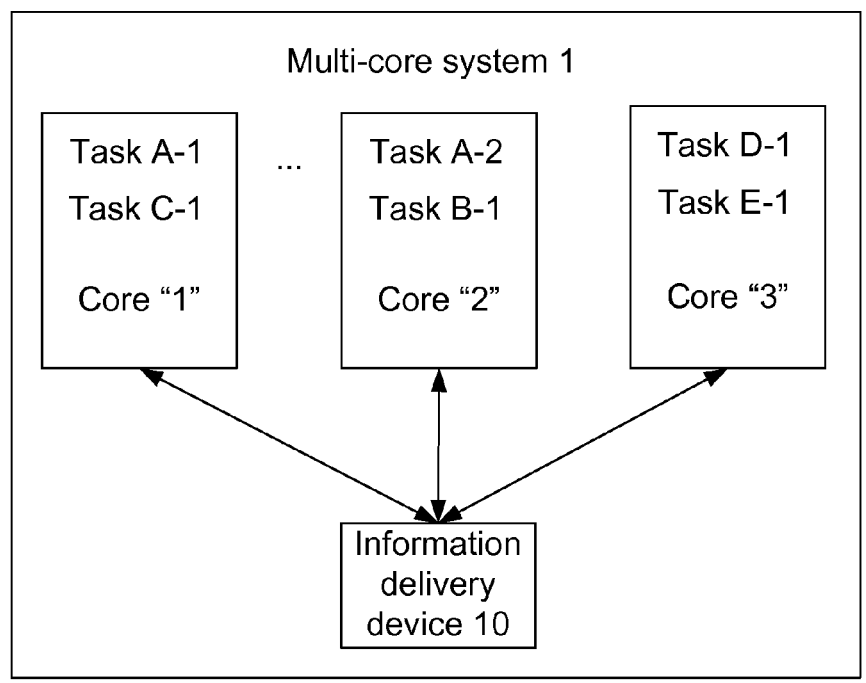
FIG. 6 is a schematic diagram illustrating another structure of a multi-core system provided in the disclosure.

Refer to FIG. 6, assuming that the multi-core system 1 is an independent multi-core system provided with the information delivery device 10 according to the disclosure. Cores "1", "2" and "3" are included in the multi-core system 1. Tasks A-1 and C-1 are contained in the core "1", tasks A-2 and B-1 are contained in the core "2", and tasks D-1 and E-1 are contained in the core "3". The preset global relationship table of the multi-core system 1 contains the correspondence relationship between the following task names and the core numbers of the cores in which the tasks are contained: A-1→"1", A-2→"2", B-1→"2", C-1→"1", D-1→"3" and E-1→"3". To send the information to be delivered, the source task first sends the information to be delivered and the name of the target task to the information delivery device 10, then, the information delivery device 10 determines a core number corresponding to the name of the target task from the preset global relationship table according to the name of the target task, searches the multi-core system 1 for a core corresponding to the core number and sends the information to be delivered to the task corresponding to the name of the target task in the core.

Figure 7:
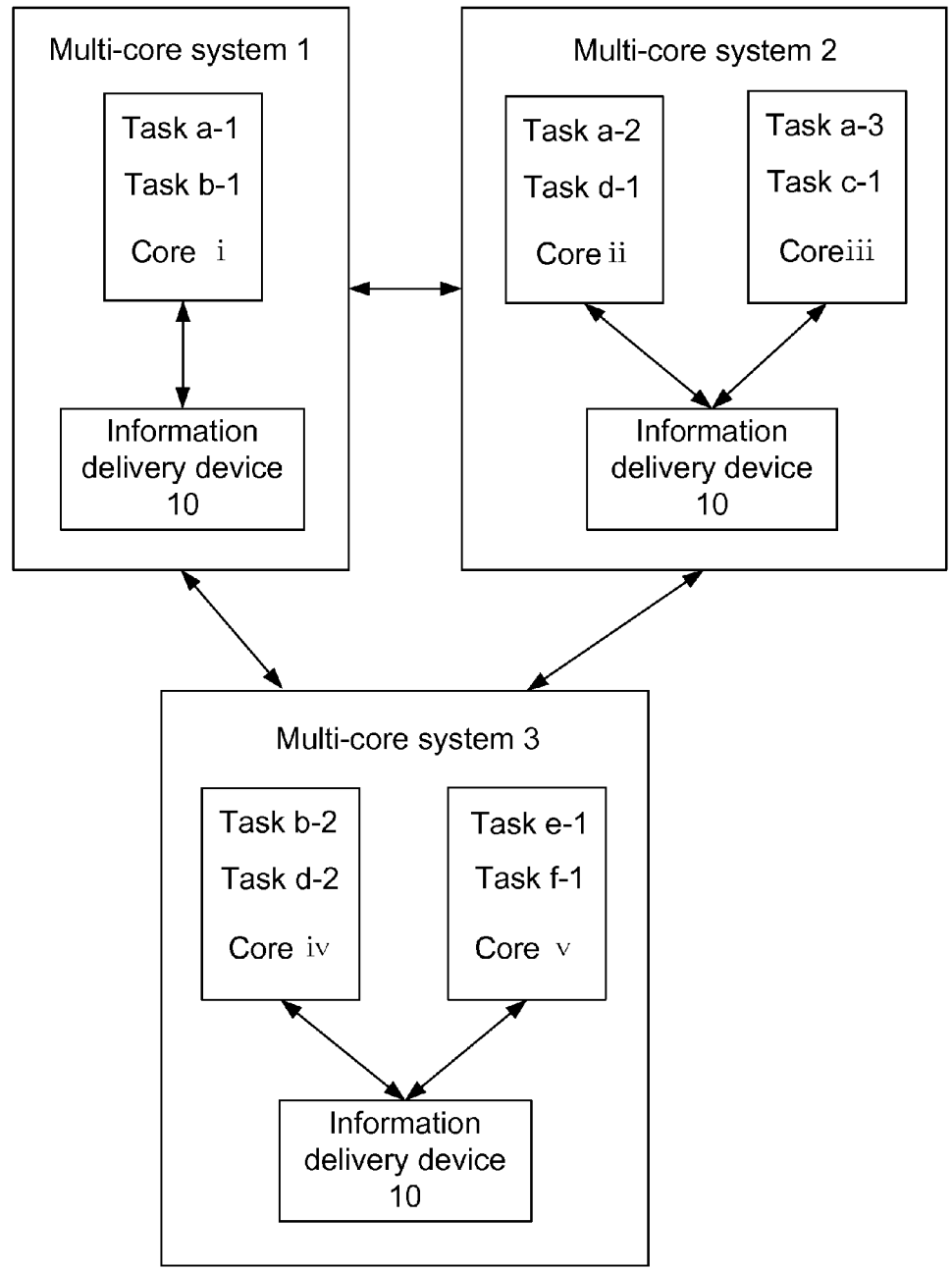
FIG. 7 is a schematic diagram illustrating another structure of multi-core systems provided in the disclosure.

Refer to FIG. 7, assuming that the multi-core systems 1, 2 and 3 are multi-core systems which communicate with each other and each of which is provided with the information delivery device 10 according to the disclosure. The multi-core system 1 includes a core i in which tasks a-1 and b-1 are contained. The multi-core system 2 includes a core ii in which tasks a-2 and d-1 are contained and a core iii in which tasks a-3 and c-1 are contained. The multi-core system 3 includes a core iv in which tasks b-2 and d-2 are contained and a core v in which tasks e-1 and f-1 are contained. The preset global relationship table of the multi-core systems contains the correspondence relationship between the following task names and the core numbers of the cores in which the tasks are contained: a-1→i, a-2→ii, a-3→iii, b-1→i, b-2→iv, c-1→iii, d-1→ii, d-2→iv, e-1→v and f-1→v. Similarly, to send the information to be delivered, the source task first sends the information to be delivered and the name of the target task to the information delivery device 10, then, the information delivery device 10 determines a core number corresponding to the name of the target task from the preset global relationship table according to the name of the target task, searches the multi-core systems 1, 2 and 3 for a core corresponding to the core number and sends the information to be delivered to the task corresponding to the name of the target task in the core.

Further, in the embodiment of the information delivery device, if the target task has only one target task instance, then the information to be delivered is directly sent to the target task instance.

Further, in the embodiment of the information delivery device, the searching module 12 is further configured to select, if the target task includes a plurality of target task instances, a target task instance according to a principle of proximity as the target task for the information to be delivered. The principle of proximity is as follows: the target task instance in the same core as the source task is selected preferentially as the target task for the information to be delivered; if there is no target task instance in the same core as the source task, then the target task instance in the same multi-core system as the source task is selected preferentially as the target task for the information to be delivered; if no target task instance is in the same core as the source task or in the same multi-core system as the source task, then the target task instance in a multi-core system different from the multi-core system where the source task is located is selected as the target task for the information to be delivered.

Further, if the source task and the target task are in different multi-core systems or in the different cores of the same multi-core system, then the information delivery device 10 may select one of the target task instances of the target task, according to the loads and the normality/abnormality condition of the target task instances, as the target task for the information to be delivered.

Take FIG. 7 as an example, assuming that the task d-1 is a source task, the task d-1 needs to send the information to be delivered to a task "a" which includes three task instances a-1, a-2 and a-3. First, the task d-1 sends the information to be delivered and the name "a" of the target task to the information delivery device 10. The information delivery device 10 finds, according to the name "a" of the target task, core numbers i, ii and iii (numbers of the cores containing the target task a) corresponding to the name "a" of the target task in the preset global relationship table. Then, the information delivery device 10 searches the multi-core systems 1, and 2 and 3 for cores i, ii and iii corresponding to the core numbers i, ii and iii. The task a-2 is in the core ii, the task a-3 is in the core iii, the task a-1 is in the core i, and the task d-1 is in the core ii. According to the principle of proximity, the information delivery device 10 preferentially selects the target task instance a-2 in the same core as the source task d-1 as the target task of for information to be delivered and then sends the information to be delivered to the task a-2 in the core ii. If the target task instance a-2 selected as the target task is abnormal or overloaded, then, another target task instance is selected upon the same principle as the target task for the information to be delivered. That is, if the target task instance a-2 is abnormal or overloaded, the information delivery device 10 preferentially selects the target task instance a-3 in the same multi-core system as the source task d-1 as the target task for the information to be delivered and then sends the information to be delivered to the task a-3 in the core iii. If the target task instances a-2 and a-3 are both abnormal or overloaded, then the information delivery device 10 selects the target task instance a-1 in a different multi-core system with respect to the source task d-1 as the target task for the information to be delivered and then sends the information to be delivered to the task a-1 in the core i. That is, when the target task instance selected as the target task is abnormal or overloaded and there are two or more other target task instances, then one of the other target task instances is selected upon the same principle as the target task for the information to be delivered, thus improving information delivery speed and efficiency and avoiding the occurrence of a failed information delivery.

Take FIG. 7 as an example, assuming that the task c-1 is a source task, the task c-1 needs to send the information to be delivered to a task d which includes two task instances d-1 and d-2. First, the task c-1 sends the information to be delivered and the name "d" of the target task to the information delivery device 10, and the information delivery device 10 finds, according to the name "d" of the target task, core numbers ii and iv (numbers of the cores containing the target task d) corresponding to the name "d" of the target task in the preset global relationship table. Then, the information delivery device 10 searches the multi-core systems 1, and 2 and 3 for cores ii and iv corresponding to the core numbers ii and iv. The source task c-1 is in the core iii, the task d-1 is in the core ii which is in the same multi-core system 2 as the core iii; the task d-2 is in the core iv of the multi-core system 3. According to the principle of proximity, the information delivery device 10 preferentially selects the task d-1 as the target task for the information to be delivered and then sends the information to be delivered to the task d-. If the task d-1 is abnormal or overloaded, then the information delivery device 10 selects the task d-2 as the target task for the information to be delivered and then sends the information to be delivered to the task d-2.

Take FIG. 7 as an example, assuming that the task d-2 is a source task, the task d-2 needs to send the information to be delivered to the task "a", which includes three task instances a-1, a-2 and a-3. First, the task d-2 sends the information to be delivered and the name "a" of the target task to the information delivery device 10, and the information delivery device 10 finds, according to the name "a" of the target task, core numbers i, ii and iii (numbers of the cores containing the target task "a") corresponding to the name "a" of the target task in the preset global relationship table. Then, the information delivery device 10 searches the multi-core systems 1, and 2 and 3 for cores i, ii and iii corresponding to the core numbers i, ii and iii. None of the task instances a-1, a-2 and a-3 of the task a is in the same core as the source task d-2 or in the same multi-core system, the task a-1 is in the multi-core system 1, and tasks a-2 and a-3 are in the multi-core system 2. If the information delivery device 10 cannot select a task instance according to the principle of proximity, then the information delivery device 10 selects, according to the normality or abnormality condition and the loads of the three task instances of the task "a", a normal low-loaded task instance as the target task for the information to be delivered.

By selecting a target task according to the principle of proximity, the information delivery device 10 improves the speed and efficiency of information delivery, avoids the occurrence of a failed information delivery and guarantees balanced workloads of different task instances of the same task.

Further, if the target task includes a plurality of target task instances, the embodiment of the information delivery device 10 directly selects the least-loaded target task instance as the target task for the information to be delivered, without using the principle of proximity. Take FIG. 7 as an example, assuming that the task a-1 is a source task, the task a-1 needs to send the information to be delivered to the task d. First, the task a-1 sends the information to be delivered and the name "d" of the target task to the information delivery device 10, and the information delivery device 10 finds, according to the name "d of the target task, core numbers ii and iv (numbers of the cores containing the target task d) corresponding to the name "d" of the target task in the preset global relationship table. Then, the information delivery device 10 searches the multi-core systems 1, and 2 and 3 for cores ii and iv corresponding to the core numbers ii and iv. As the task d has a high-loaded task instance d-1 in the core ii and a low-loaded task d-2 in the core iv, the task d-2 in the core iv is selected as the target task for the information to be delivered, the information delivery device 10 sends the information to be delivered to the task d-2 in the core iv. If the target task instance d-2 selected as the target task is abnormal, then the information delivery device sends the information to be delivered to the task d-1 in the core ii. If the target task instance selected as the target task is abnormal and there are two or more other target task instances, then one of the other target task instances is selected upon the same principle as the target task for the information to be delivered, thus guaranteeing the balanced workloads of different task instances of the same task and preventing the occurrence of a failed information delivery.

The embodiment of the information delivery device can realize the delivery of information within a multi-core system or between multi-core systems with high reliability, improve the speed and efficiency of information delivery, balance workloads of task instances in a multi-core system and prevent a failed information delivery.

In the disclosure, when the multi-core system is an independent multi-core system, the information delivery device configured in the multi-core system maintains one preset global relationship table independently. If the multi-core systems refer to a plurality of multi-core systems communicating with each other, then each multi-core system is provided with an information delivery device which maintains a preset global relationship table separately, or only one information delivery device is selected to maintain a preset global relationship table. If each information delivery device maintains a preset global relationship table respectively, then the preset global relationship tables in the information delivery devices need to be synchronized.

It should be appreciated that the above-mentioned embodiments are only preferred ones of the disclosure but not to be construed as limiting the scope of the disclosure, and that any equivalent structure or flow modification devised without departing from the content disclosed in the specification or accompanying drawings and any direct or indirect application of the disclosure to other related technical field belongs to the protection scope of the disclosure.

The invention claimed is:

1. An information delivery method, comprising:
   receiving information to be delivered and a name of a target task which are sent from a source task, wherein the target task includes one or more target task instances, which are contained in a same core of a same multi-core system, or in different cores of a same multi-core system, or in cores of different multi-core systems;
   searching, according to the name of the target task, a preset global relationship table for a core number corresponding to the name of the target task; and
   searching a multi-core system for a core corresponding to the core number and sending the information to be delivered to the task corresponding to the name of the target task in the core,
   wherein when the target task includes a plurality of target task instances, a target task instance is selected according to a principle of proximity as the target task for the information to be delivered.

2. The information delivery method according to claim 1, wherein
   the preset global relationship table contains a correspondence relationship between a name of a task in the multi-core system and a core number of a core in which the task is contained.

3. The information delivery method according to claim 2, wherein
   the source task and the target task are contained in a same core of a same multi-core system, or in different cores of a same multi-core system, or in cores of different multi-core systems.

4. An information delivery device, comprising:
   a memory, configured to store instructions;
   a processor, configured to perform the operations of, by executing the instructions stored in the memory,
   receiving information to be delivered and a name of a target task which are sent from a source task, wherein the target task includes one or more target task instances, which are contained in a same core of a same multi-core system, or in different cores of a same multi-core system, or in cores of different multi-core systems;
   searching, according to the name of the target task, a preset global relationship table for a core number corresponding to the name of the target task; and
   searching a multi-core system for a core corresponding to the core number and to send the information to be delivered to the task corresponding to the name of the target task in the core,
   wherein when the target task includes a plurality of target task instances, a target task instance is selected according to a principle of proximity as the target task for the information to be delivered.

5. The information delivery device according to claim 4, wherein
   the preset global relationship table contains a correspondence relationship between a name of a task in the multi-core system and a core number of a core in which the task is contained.

6. The information delivery device according to claim 5, wherein
   the source task and the target task are contained in a same core of a same multi-core system, or in different cores of a same multi-core system, or in cores of different multi-core systems.

* * * * *